US009690808B2

(12) United States Patent
Roy-Faderman et al.

(10) Patent No.: US 9,690,808 B2
(45) Date of Patent: Jun. 27, 2017

(54) METHODS AND SYSTEMS FOR LOOSE COUPLING BETWEEN TRIGGERS AND ENTITIES

(75) Inventors: Avrom Irwin Roy-Faderman, Sunnyvale, CA (US); Billy Ma, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 222 days.

(21) Appl. No.: 13/289,116

(22) Filed: Nov. 4, 2011

(65) Prior Publication Data
US 2012/0143837 A1 Jun. 7, 2012

Related U.S. Application Data

(60) Provisional application No. 61/418,773, filed on Dec. 1, 2010.

(51) Int. Cl.
*G06F 17/30* (2006.01)

(52) U.S. Cl.
CPC .... *G06F 17/30289* (2013.01); *G06F 17/3051* (2013.01)

(58) Field of Classification Search
CPC .......... G06F 17/3056; G06F 17/30905; G06F 9/4443; G06F 9/542; G06F 17/3051; G06F 17/30289; G06F 17/30286; G06F 17/30569; G06F 3/0481; G06F 2209/545
USPC ........................................................ 706/60
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |

(Continued)

*Primary Examiner* — William Spieler
(74) *Attorney, Agent, or Firm* — Dergosits & Noah LLP; Todd A. Noah

(57) ABSTRACT

A database program includes loose triggers that are not coupled to specific entities at the time the database program is compiled. The database program provides a user interface that allows a user to couple selected entities to the loose triggers or decouple selected entities from loose triggers. The database program validates the entities that are selected by the user for coupling or decoupling and stores the coupled entities as part of the loose trigger definitions in a loose trigger metadata database.

21 Claims, 12 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 * | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069871 A1 * | 4/2003 | Yucel .............................. 706/60 |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 * | 9/2004 | Lee et al. ....................... 707/200 |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |

* cited by examiner

FIG. 10

| Triggers | | | |
|---|---|---|---|
| Name | Namespace | Version | Entity Type |
| demoTrigger | | 25 | Any |
| T1 | | 13 | Entity 1 |
| | | | |
| | | | |
| | | | |

| Triggers | | | |
|---|---|---|---|
| Name | Namespace | Version | Entity Type |
| demoTrigger | | 25 | Any | demoTrigger is bound to:

Entity 12          Entity 13

180
182

METHODS AND SYSTEMS FOR LOOSE COUPLING BETWEEN TRIGGERS AND ENTITIES

CLAIM OF PRIORITY

This application claims the benefit of U.S. Provisional Patent Application 61/418,773 entitled Loose Coupling between Triggers and Objects by Roy, et al., filed Dec. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to methods and systems for triggers that are loosely coupled to data entities in a computing environment.

BACKGROUND

Organizations can run and customize existing database application programming interfaces (APIs) or build new custom database APIs based on particular business needs. Database triggers can be present within the APIs that are procedural codes that are executed in response to user interactions with a database. For example, a trigger can be a code that is executed before or after various types of database operations are executed such as: insert, update, delete, merge, undelete, etc. A trigger can be used to perform a number of automatic actions, such as cascading changes through related tables, enforcing column restrictions, comparing the results of data modifications, and maintaining the referential integrity of data across a database. The standard trigger procedure is to activate a trigger function in an API or provide a trigger code that is directed towards a specific entity.

Conventional "tight triggers" require that specific entities be defined and applied to the trigger at the time the database is created and before the trigger program is compiled. These tight triggers are inefficient for situations where the entity is not defined at the time the trigger is developed. Accordingly, it is desirable to provide "loose triggers" that are not tightly coupled to an entity.

BRIEF SUMMARY

While one or more implementations and techniques are described with reference to an embodiment of the mobile test framework in an online demand service environment that is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

A database trigger is procedural code that can be automatically executed in response to certain detected events in a database. Current database systems can have "tight triggers" that are tightly coupled to pre-defined database entities and do not allow database users to selectively couple entities to the triggers across tables of the database after the trigger code has been compiled. The programmer may define a tight trigger by selecting an entity to be coupled to the tight trigger and writing the computer code defining the processing performed by the trigger.

In contrast to tight triggers, an embodiment of the present invention is directed towards "loose triggers" that can include trigger coding for the processes to be executed but may not define some or all of the entities coupled with the trigger. In an embodiment, the loose triggers can be configured to be coupled to one or more entities that are selected by a user after the trigger code has been compiled. The trigger code can be written to provide a trigger function but the trigger function may not be applied to any specific entity or entities at the time the trigger code is compiled.

In other embodiments, the trigger code can be written and each of the loose triggers may be optionally coupled to a predetermined set of entities. One or more of the entities in the predetermined set can be coupled to the trigger by the user through a user interface after the trigger code has been compiled. However, the user may not be able to couple entities that are not part of the predetermined set of entities to the loose trigger. In some embodiments, the trigger code may require one or more predetermined entities to be coupled to the loose trigger. The user may be required to have these predetermined entities coupled to the loose trigger but may also have the option of coupling additional entities to the loose trigger.

After the database application with loose triggers has been written and tested, the database application program can be provided to users. In an embodiment, the program can include a graphical user interface that may include a listing of loose triggers. Through the user interface, the user can select the loose triggers and one or more entities that are to be coupled to each of the loose triggers. Once the triggers are properly coupled to the entities, the program may include a validation process that checks the validity of the coupling of the loose trigger to each of the selected entities. If a selected entity is valid, the program can couple the selected entity and loose trigger. If the selected entity is invalid, the program may issue an error message and decouple the entity from the loose trigger.

The user may also deselect entities to be decoupled from the loose triggers and the program may include a validation process that checks the validity of the decoupling of the selected entities from the loose triggers. If an unselected entity is valid, the program can decouple the selected entity from the loose trigger. If the deselected entity is invalid, the program may issue an error message and maintain the coupling of the entity to the loose trigger. The loose triggers allow the definition of the trigger entities to be deferred until after the trigger code is compiled and subsequent compiling is not required.

Once the selected and unselected entities have been validated, the loose triggers and coupled entities can be stored as metadata in a trigger metadata database. The database program can actuate the loose triggers before or after the relevant commands are issued to the database. For example, a trigger can be executed before or after specific data manipulation language (DML) events occur, such as before object records are inserted into the database, or after records have been deleted.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 10-11 illustrate a user interface illustrating a listing of loose and tight triggers and coupled entities;

DETAILED DESCRIPTION

Systems and methods are provided for loose triggers used in a database program that can be used in an online demand service environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Many database system software programs include pre-built APIs that provide additional functionality and it is also possible for system administrators and developers to create custom APIs to add custom functionality to database systems. The coding that is required to create the APIs can include database triggers that are procedural codes in a programming language such as Apex script that can be automatically executed in response to certain events in a database. The connection between the triggers and their corresponding entities can be predefined by the programmer of the API. This type of predefined coupling between the trigger and the entity or entities can be known as a "tight trigger."

In contrast to tight triggers, "loose triggers" can be triggers that are not coupled to one or more predetermined specific entities at the time the loose trigger code is compiled. In an embodiment, a user of the API can select or deselect the entity or entities that are to be coupled to a loose trigger through a user interface. The program can also validate the selected and deselected entities to be coupled with the loose trigger. If errors are detected, the program can issue an error message and correct the erroneous entity couplings. The loose trigger code does not have to be recompiled after the entity or entities are coupled to the trigger by the user through the user interface.

The tight or loose trigger can be actuated by detection of the entity or entities that are coupled to the trigger. In different embodiments, the triggers can be written to execute the trigger function before or after the detection of certain types of operations such as: insert, update, delete, merge, upsert, undelete, etc. Triggers can be used to maintain the integrity of the information in a database. For example, when a new record (representing a new worker) is added to an employees table, a trigger can be actuated to create new records for the new employee in other tables for other employee related accounting such as: taxes, vacations, and salaries.

Figure 1:
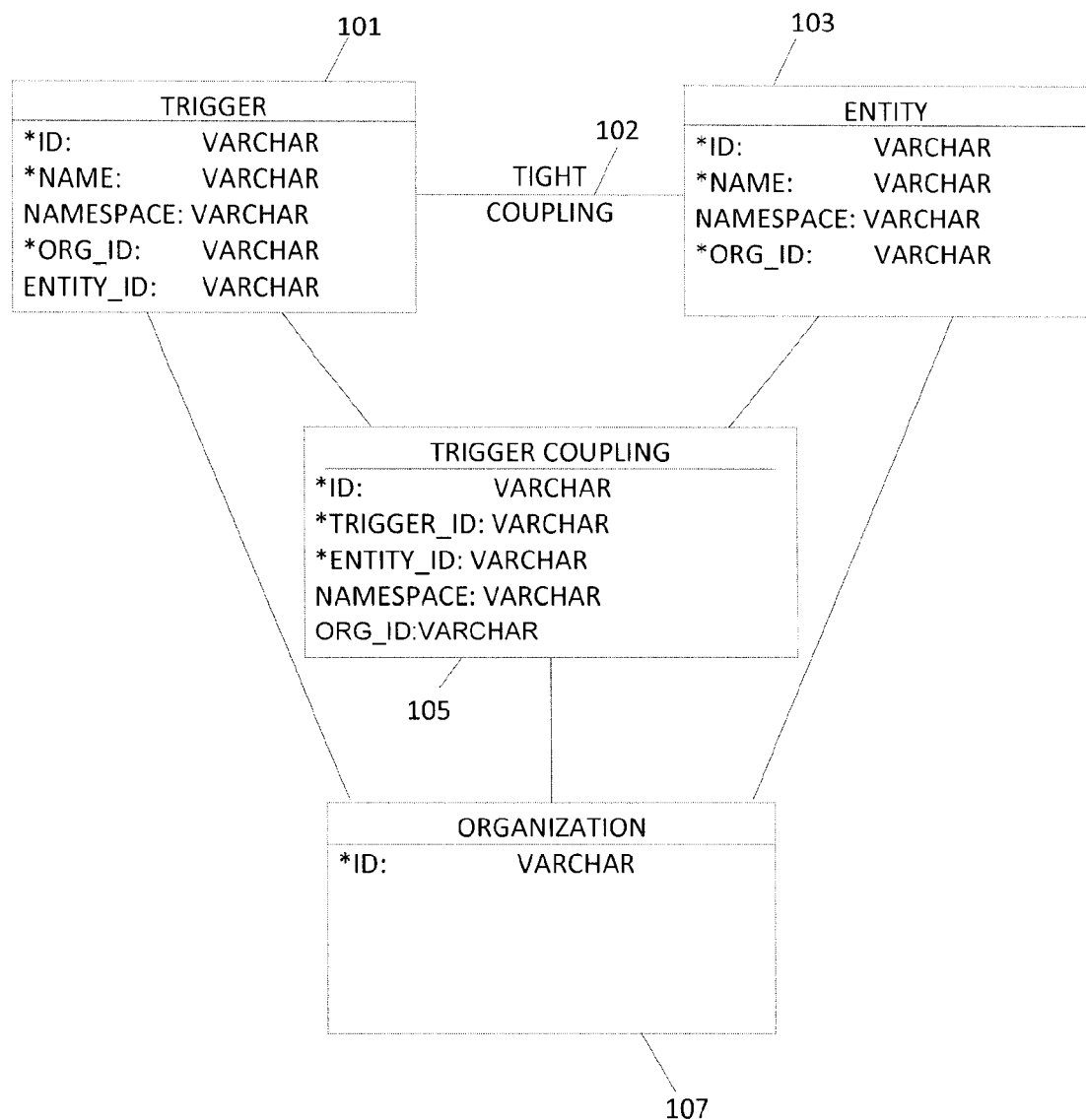
FIG. 1 illustrates a block diagram of an example of a tight trigger and a loose trigger.

Some of the differences between a "tight coupling" and a "loose coupling" are illustrated with reference to FIG. 1. The trigger 101 can include an ID, a name, a body, a namespace, an organization ID and an entity ID. With a tight trigger, the trigger 101 is directly connected through a direct coupling connection 102 to the entity 103 which can have the same ID, name, body, namespace and organization ID. The trigger 101, tight coupling 102 and the entity 103 can be fixed and may only be altered before the database program is compiled.

The trigger 101 isn't expressly coupled to any specific entity, but the loose couplings allow the trigger 101 to be coupled to selected entities. Because the loose couplings are pure metadata objects requiring no compilation, they can be created or deleted, making new or fewer linkages, at any time in the process. In contrast to tight triggers, a loose trigger can include one or more loose couplings 105. The Trigger 101 may not provide any express coupling to any specific entity. The entity or entities coupled to the loose triggers can be designated by the users of the API who may be administrators or business developers through a user interface. In this example, the loose coupling 105 may have some or all of the following attributes: ID, TRIGGER_ID, ENTITY_ID, namespace and organization ID. The ID is an identification specifically for the loose coupling. The TRIGGER_ID corresponds to the trigger 101. The ENTITY_ID corresponds to the entity 103 so that the trigger 101 is loosely coupled to the entity 103. The NAMESPACE is specifically for the coupling and does not correspond to the namespace of either the entity 103 or the trigger 101. The entity 103, trigger 101 and coupling 103 can each be in a distinct namespace. For example, the entity 103 could come from a managed package, the loose trigger 101 can come from another package and the trigger coupling 105 could be created by the subscriber itself. The ORG_ID corresponds to the organization. While the ORG_ID may match the ORG_IDs of the entity and trigger, it can also be provided in an index so that the trigger couplings can be looked up quickly. Thus, the loose coupling 105 only uses the Entity_ID to link it to the entity and the Trigger_ID to link it to the trigger.

If the end user wishes to alter this loose trigger, the loose coupling 105 can be deleted to remove the entity 103 and then the user can create a new loose coupling 105 for any other available entity 103. It may also be possible to edit the loose coupling 105 to remove an entity or entities 103 and/or add other available entities 103. In another embodiment, the loose trigger 101 can be coupled to the entity 103 by an organization connection 107. The organization 107 can be defined by the end user of the API through a user interface and the organization 107 can be defined as an ID that matches the entity 103 which results in a loose coupling 105 between the trigger 101 and the entity 103.

As discussed, tight triggers require a trigger 101 that is directly coupled 102 to a particular entity 103. The tight trigger is part of a program written by the designer of the original packaged database application and this tight coupling is defined at the time the program is compiled. In contrast, a program written with loose triggers can include the trigger 101 but does not require a tight coupling 102 to couple an entity 103 to the trigger 101. Also, the entity or entities associated with the trigger 101 may not be predetermined when the program is compiled. Rather, a loosely coupled trigger 101 can be coupled, post-compilation, to any entity 103 on which it is legal to create a loose trigger. If the trigger 101 is used with a programming language such as Apex, this loose coupling 105 to an entity 103 can be performed without the program Author's participation. The loose trigger coupling 105 can be defined by a developer in a subscriber organization or a user through a managed UI. Thus, a user can couple the trigger 101 to an entity 103 and/or change the coupling without any knowledge of the trigger programming language.

Figure 2:
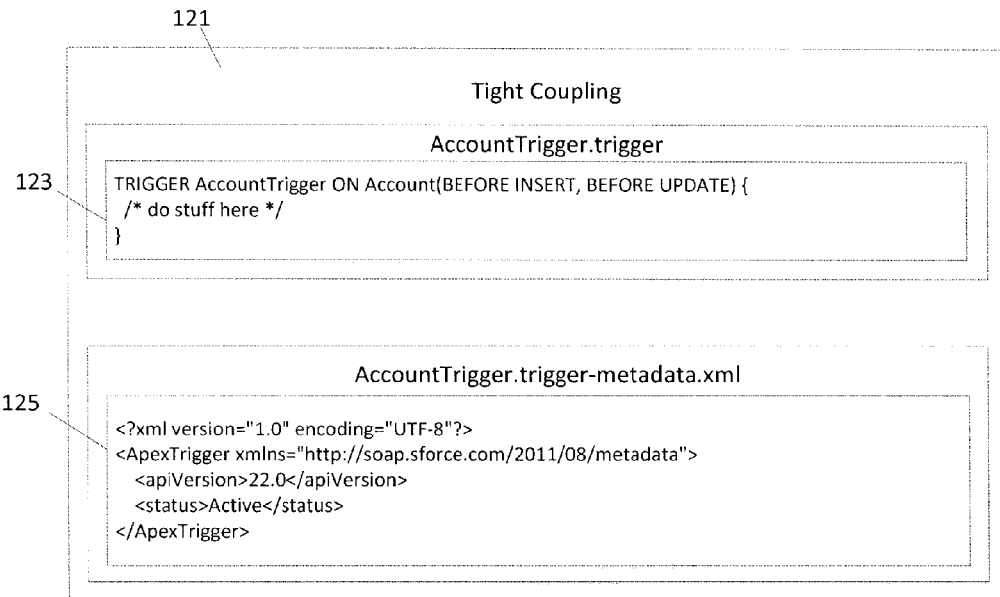
FIGS. 2-6 illustrate examples of coding for tight triggers and loose triggers.
Figure 3:
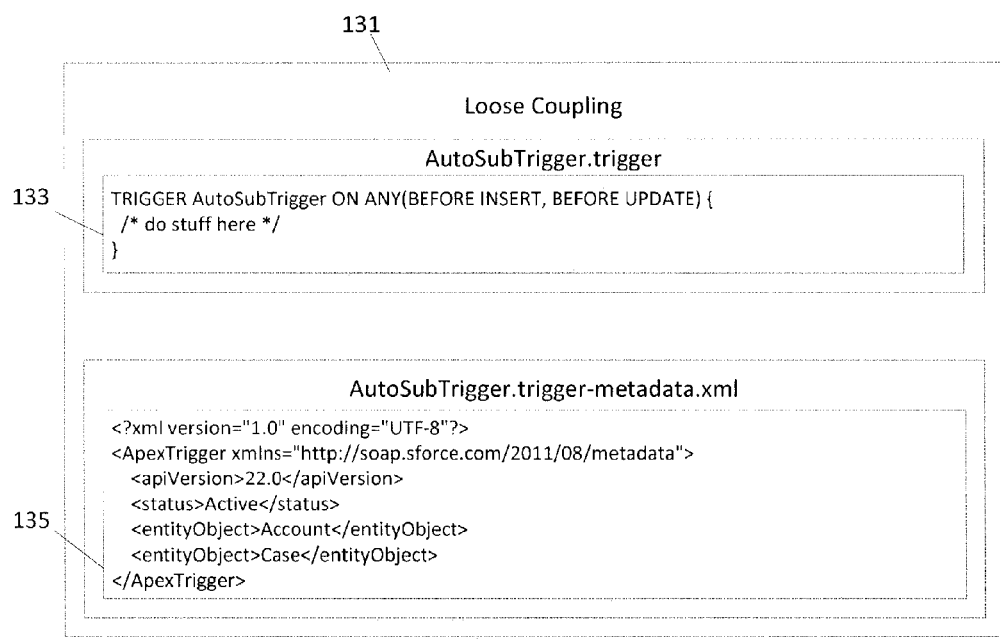

With reference to FIG. 2, an example of coding for a tight trigger 121 is illustrated. In this example, the tight trigger 121 can have the trigger name, "AccountTrigger.trigger" 123. In this example, the tight trigger 123 is actuated before data is inserted and before data is updated. With reference to FIG. 3, an example of coding for a loose trigger 131 is illustrated. In this example, the loose trigger 131 can have the trigger name, "AutoSubTrigger.trigger" 133 and the loose trigger coupling can be indicated by the term "on any." In this example, the loose trigger 133 is actuated on any loosely coupled objects selected by a database user before data is inserted or before data is updated. In other embodiments, the loose trigger can be indicated by any other term or, indeed, by another syntax entirely. In the example embodiments, the term "on any" can be used because there is no standard object called "any" and custom objects always have a suffix such as "_c" or "_kav." Thus, there is no chance of confusion between a loose trigger and a tight trigger. It is possible that a system that does not provide similar limits on database object names may need to use an entirely different syntax to distinguish loose triggers from tight triggers.

The coding for the tight trigger metadata 125 and the loose trigger metadata 135 is similar. However, in this example, the loose trigger metadata 135 in FIG. 3 includes the code lines:
<entityObject>Account</entityObject>
<entityObject>Case</entityObject>

These lines in the loose trigger 135 are in the metadata file 125. In contrast, when a trigger is tightly coupled, the coupling takes place in the trigger code 123 itself rather than the metadata file 125 as shown in FIG. 2. This additional metadata can define the entities that can be selectively coupled to the loose trigger 131 by the user through a user interface. Each <entityObject> line corresponds to a selected entity defined by a user. These lines can be a representation of the data that can be selected using the loose trigger user interface which will be described in more detail. In this example, these lines of code indicate the presence of the selected entities "Account" and "Case" as being bound to the trigger.

Figure 4:
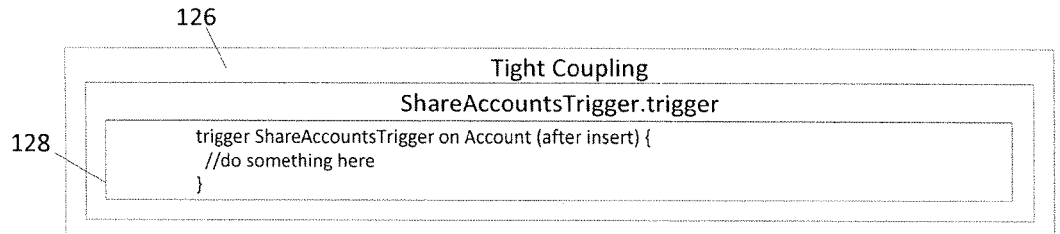

FIG. 4 illustrates another example of a tight trigger 126 and tight trigger coding 128. In this tight trigger example, the trigger name "ShareAccountsTrigger" which corresponds to the file name "ShareAccountsTrigger.trigger" only fires after an Account object entity is inserted. If the user wishes to change the trigger's target, for example from Account to Contact, the trigger portion of the program must be edited and recompiled. Thus, the entity in this tight trigger example cannot be easily changed. If a user wishes to change the coupling of the tight trigger to multiple entities, the trigger program code must be written for each entity and the code must be recompiled.

Figure 5:
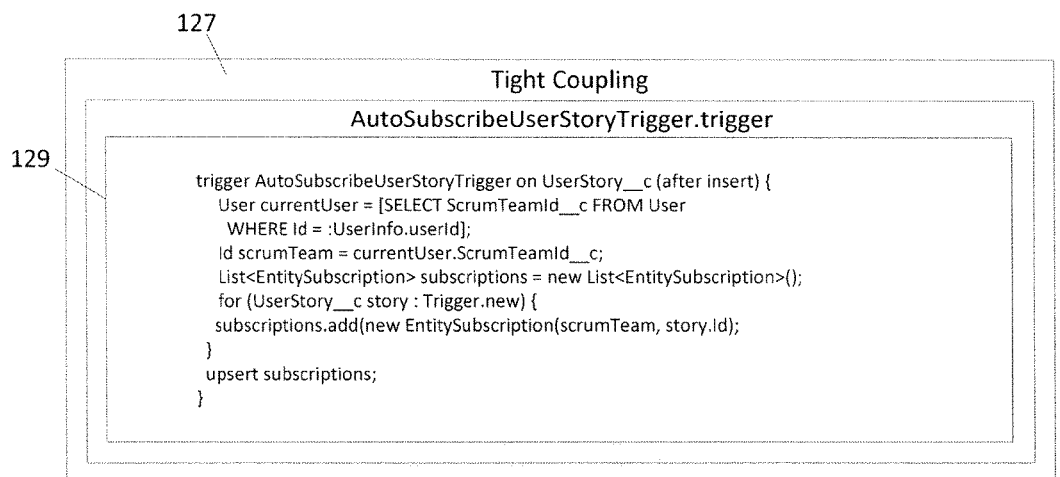

FIG. 5 illustrates an example, the file name, "AutoSubscribeUserStoryTrigger.trigger" is a tight trigger that is coupled to a single entity. An application for user teams might want the trigger coupled to a variety of entities, such as UserStory_c, Task_c, and Sprint_c. When any of the UserStory_c, Task_c, and Sprint_c entities are inserted, the user story, task, or sprint may automatically be published to the creator's scrum team's notification application. The trigger can accomplish the publishing of the objects inserted by a user. Using tight triggers, a developer must create three separate tight triggers that are each like the tight trigger 127 example of code 129 for the entity, UserStory_c. Separate triggers must be created for each such entities and more trigger coding must be written with tight triggers applied to multiple entities.

Figure 6:
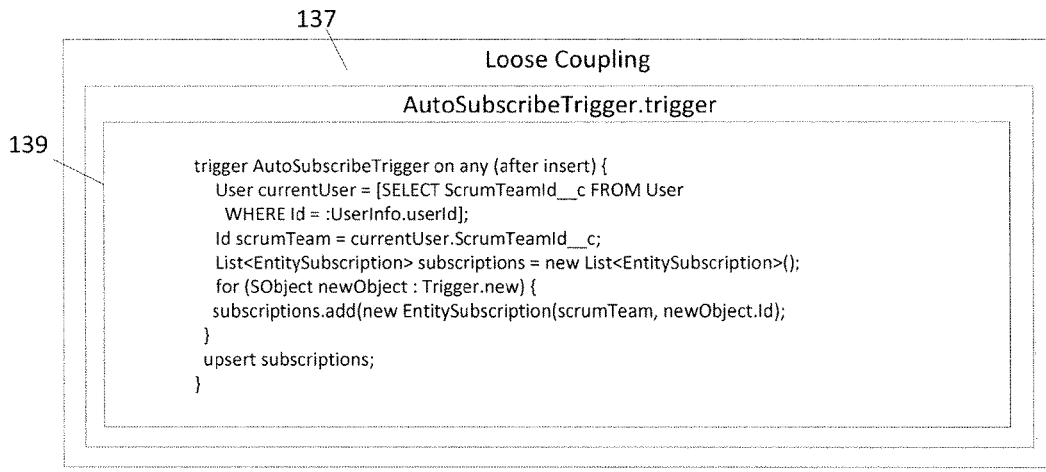

In contrast to the tight trigger coding, with reference to FIG. 6, illustrates an example of a file name "AutoSubscribeTrigger.trigger." This trigger includes loose trigger 137 code can be written that performs the same trigger function as the tight trigger shown in FIG. 5. The loose trigger 137 has coding 139 that includes much of the same tight trigger coding but can be declaratively enabled so that a selected entity or entities can be coupled to this trigger. The coding includes the line, "trigger AutoSubscribeTrigger on any (after insert){." The term "any" can indicate that some or all of the entities to be coupled are not yet defined at the time the trigger is coded. The coupled entities can be defined, added, removed or changed at any time by customers of the independent software vendor (ISV) who is the trigger developer through a user interface. It is also possible to define some of the trigger entities at the time the trigger is coded and still allow other coupled entities to be defined by the ISV customers through the user interface. In this configuration, the trigger can have both tight and loose trigger features and may be considered a hybrid tight/loose trigger. It is also possible for the ISV to configure the user interface control the entities that can be added, removed or changed by the ISV customer through the user interface. Thus, an ISV could package this trigger or a similar trigger, together with the custom attribute and allow the ISV's customers to use the loose trigger to declaratively create auto-subscription rules for any number of entities that are permitted by the program.

Although most of the ISV's customers will probably not themselves be ISVs, some of them can be. In this situation, a second ISV can repackage the triggers from a first ISV with additional required couplings. These additional required couplings may be necessary for them to make the second ISV's packaged application work for their own customers. The additional required couplings may be required for the program to be fully functional with all of the second ISV's customers. The second ISV may never require fewer required couplings than the first ISV.

Figure 7:
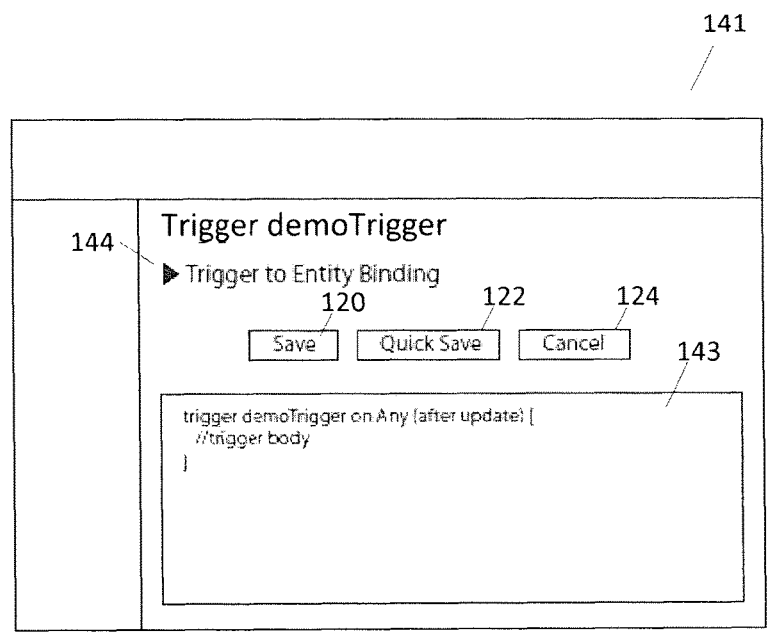
FIGS. 7-9 illustrate an example of a user interface for coupling entities to loose triggers.
Figure 8:
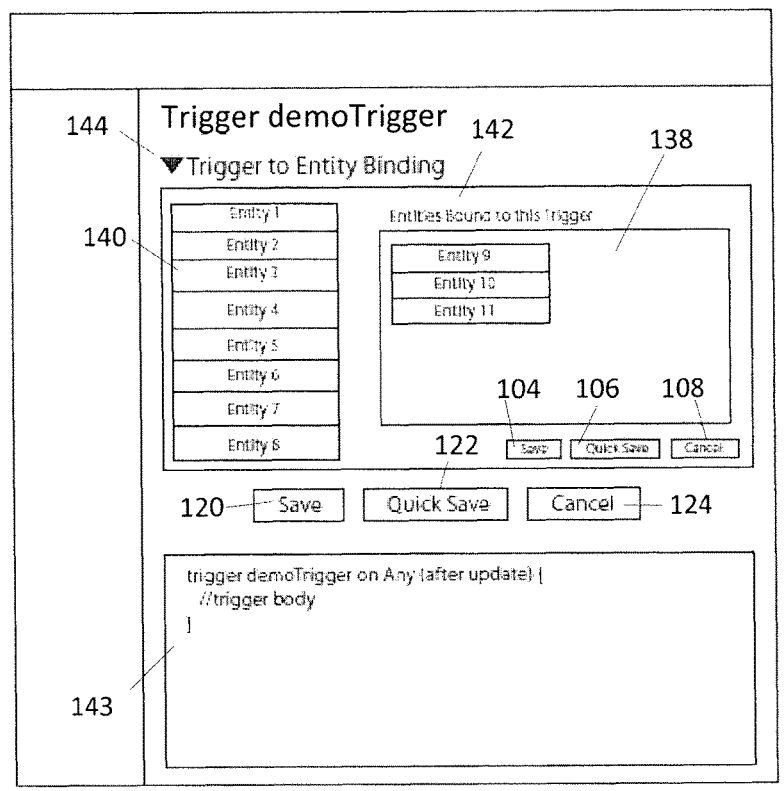

FIGS. 7 and 8 illustrate an example of a developer user interface 141 used to couple a loose trigger to selected entities. The developer user interface 141 may also include a source code area 143 where the trigger source code can be written. In this example, the source code, "Trigger demoTrigger on Any (after update){//trigger body}" can indicate that the demoTrigger trigger is actuated after any entity that is bound to the trigger is updated. In an embodiment, the user can input the source code and after the code is complete click on a save button 120 or quick save button 122 to save the code. Alternatively, if the user does not wish to save the code, the user can click on the cancel button 124.

The developer user interface 141 can include a button 144 that expands (shown in FIG. 8) or collapses (Shown in FIG. 7) a window 142 that may show a listing of entities 140 and a listing of entities bound to the trigger 138. In an embodiment, the user can click, drag or input the entities that are to be bound to the trigger and these entities will appear in the listing of entities bound to the trigger 138. Once the bound entities are selected, the developer can click on a save button 104 or quick save button 106 to save the loose trigger bound entities listing. Alternatively, if the user does not wish to save the listing, the user can click on the cancel button 108. Once the developer has completed the program code, the code can be compiled and tested. After the program code has passed testing, the program with loose triggers can be provided to subscriber users.

Figure 9:
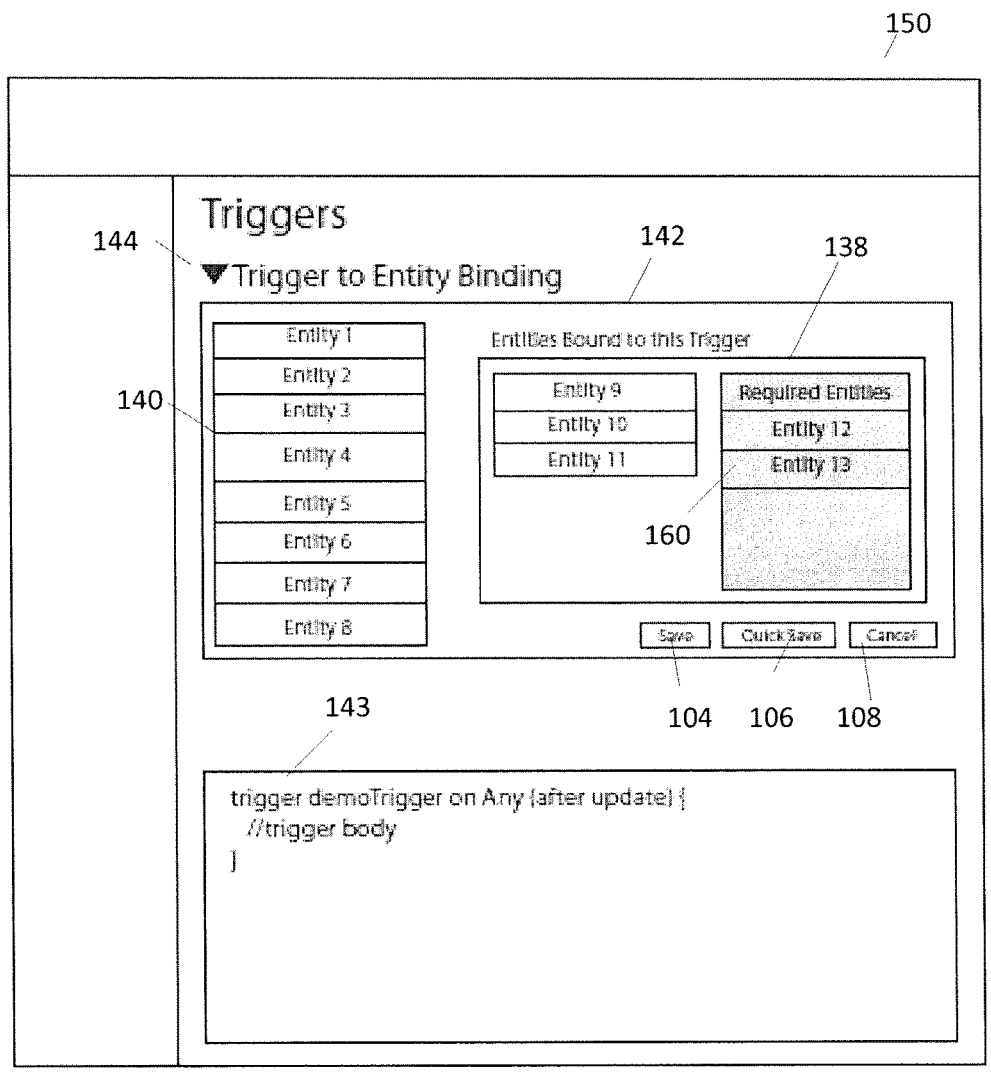

With reference to FIG. 9, an embodiment of a loose trigger subscriber user interface is illustrated. The subscriber user interface 150 may include a window 142 that may show a listing of entities 140 and listing of entities bound to the trigger 138. The user may be able to adjust the listing of entities bound to the trigger 138 and then save or cancel these changes using the save button 104, quick save button 106 or the cancel button 108. Some of the entities may be "required" entities that cannot be removed or decoupled from a designated loose trigger. In an embodiment, the required entities 160 are indicated by shading or other required status designation means.

If no restrictions are in place, anyone may be able to edit the triggers at any time including the initial development, beta release and final release. However, in an embodiment, it is also possible to limit the ability of users to input source code in the source code area 143. For example, in an embodiment, the ability to edit the source code can be limited based upon the category of the user. If the user is a member of an organization developing the trigger this user may have permission to edit the trigger source code. However, if the user is only a subscriber to or a consumer of the trigger, the user may not have permission to edit the trigger source code. It is also possible to limit the ability to edit the trigger source code based upon the permission granted to a specific user by the organization. For example, if the user has permission from the organization, the user may have full access to edit the trigger source code. However, if the user does not have permission and/or the user is a member of an organization is only consuming the trigger, the user may only have read only access to the source code area 143 and no ability to edit some or all of the triggers.

In some embodiments, the subscriber user interface 150 may be able to see the source code area 143, but may not be able to edit some or all of the triggers. In other embodiments, the developer of the trigger might even be able to prevent subscribers from seeing the source code at all. In these embodiments, in which case the source code area 143 may only contain the trigger's header and possibly a placeholder text or symbol to indicate the existence of hidden source code. This concealment of the source code could be important if the trigger implementation constitutes confidential intellectual property (IP) for the developing organization. Thus, the save 120, 122 and cancel 124 buttons of the developer user interface 141 shown in FIGS. 7 and 8 may not be included in the subscriber user interface 150.

With reference to FIGS. 10 and 11, in an embodiment the database program may include a trigger user interface 180 that lists some or all of the loose triggers that are available for the user to select coupled entities. In FIG. 10, the triggers user interface 180 includes a table that lists the names of both the tight and loose triggers, the namespace, the version and the entity type that the loose trigger can be bound to. In this example, a tight trigger is named "T1" and the version being used is version 13 and is coupled to "Entity 1." The loose trigger is named "demotrigger" the version that is being used is version 25 and is compatible with any entity type. With reference to FIG. 11, in an embodiment a user can cause the trigger user interface 180 to display a bound entity window 182 that lists the entities that the each of the loose triggers is currently coupled to. In this example, the "demotrigger" loose trigger is bound to "Entity 12" and "Entity 13." This listing of entities can be displayed when the user actuates an entity listing command.

Loosely coupled triggers may not be executed on an entity unless they are specifically coupled to that entity. Thus, at execution time, the loosely coupled triggers may create no more performance overhead than duplicate triggers for the entities would. Loosely coupled triggers may also likely save database memory space due to less redundant code that is required by tight triggers. Loosely coupled triggers can also reduce the number of times code must be compiled, because the loosely coupled triggers can be applied to a variety of entities without recompilation. In an embodiment, loosely coupled triggers can be compiled and, once retrieved, these loosely coupled triggers can be executed using the same mechanisms as tight triggers. Therefore the loose trigger features can depend heavily on existing standard trigger functionality.

Figure 12:
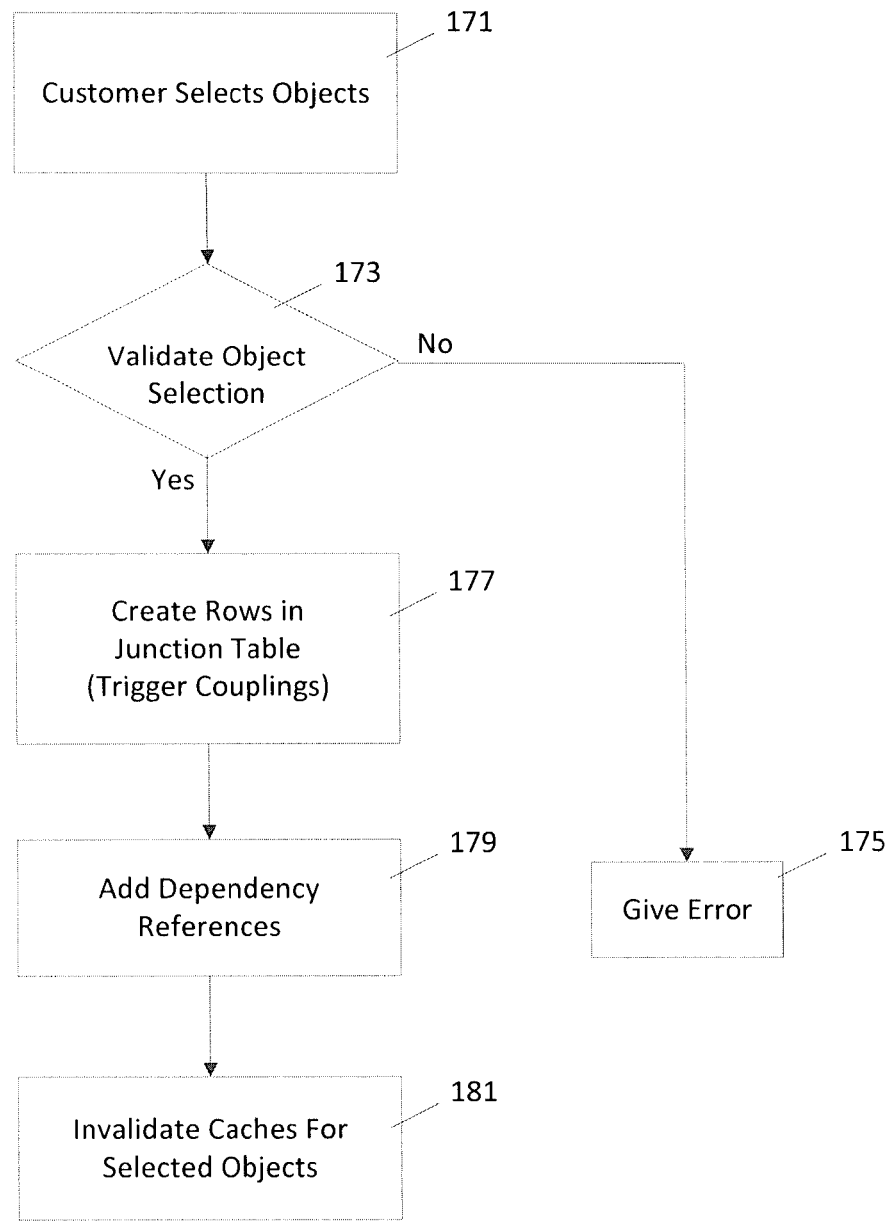
FIG. 12 illustrates a flow chart for validating entities selected by a user.

In some embodiments, the database program may perform validation operations for the user selected entities. With reference to FIG. 12, after the user selects the entities 171, the system can attempt to validate the entity selection(s) 173. In order to be valid, the entity must be allowed by the trigger rules. If the entity selection(s) cannot be validated, the system can give an error message 175 and deselect the entity. There are various reasons why the entity selection cannot be validated. For example, the database provider may decide to disallow "any" triggers on certain entities that can be tightly or loosely coupled. Since those entities change often that the database provider can be concerned about system impact of specific entity selections. This is especially relevant in a multitenancy situation. It is also possible that the database provider may decide to limit the number loose couplings an organization are allowed to have, in total, per entity, per trigger, or in any combination of the above. This limitation can again be applied for system impact reasons, or to provide different service levels. The database provider could offer a mechanism for the trigger developers to specify their own validation rules, so that the trigger can only be applied to entities with features they specify. For example, the triggers may only be available to entities that have a field of a particular name and type.

The user can then start over by selecting a different entity 171 to couple to the loose trigger. If the entity selection(s) are validated the system can create rows in the junction table which are the trigger couplings 177. The system can then add dependency references 179 and invalidate any caches for selected entities 181.

Figure 13:
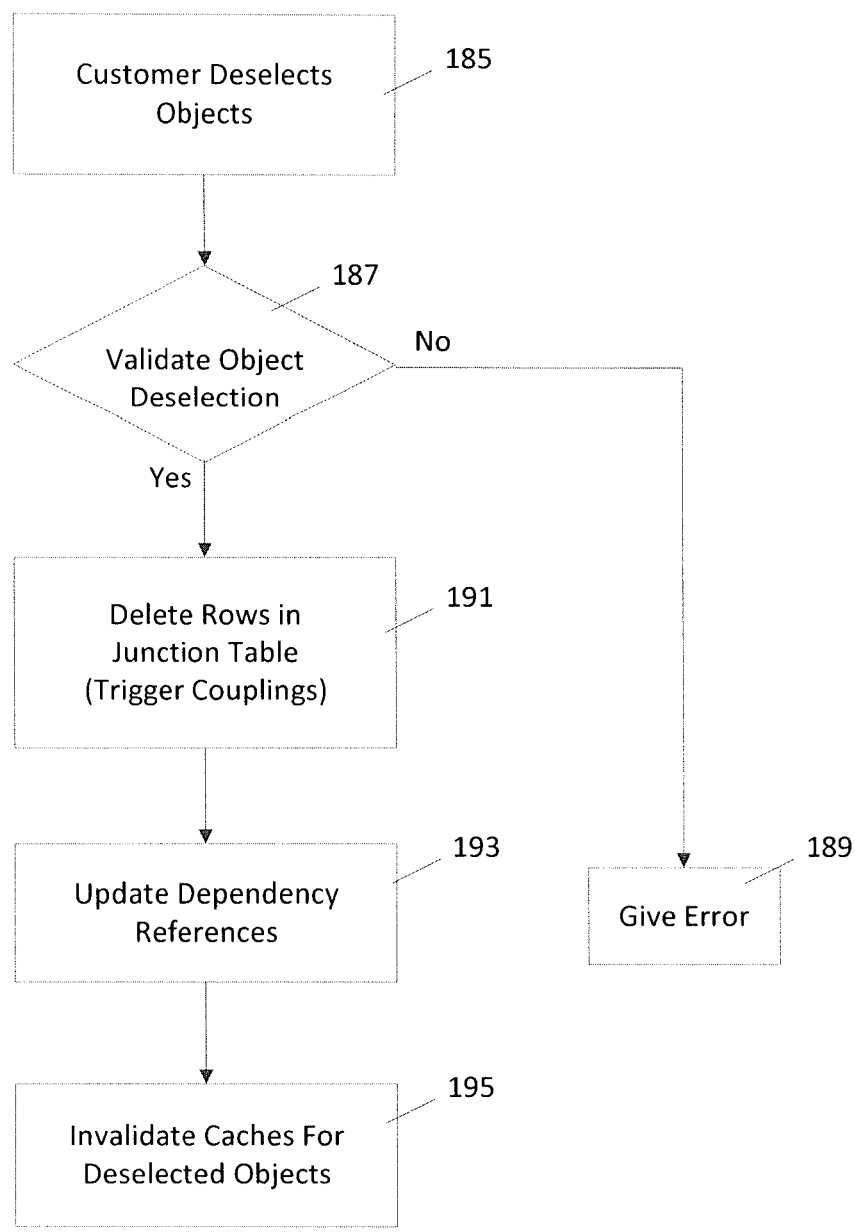
FIG. 13 illustrates a flow chart for validating entities deselected by a user.

With reference to FIG. 13, if the user deselects an entity 185, the system can validate the entity deselection 187. If the entity deselection is invalid based upon the trigger rules, the system can issue an error 189 and the deselection of the entity can be stopped. For example, in some cases, the entity may be a "required entity" that cannot be deselected. If the entity deselection is validated, the system can delete the portions of the junction table which are the trigger couplings for the deselected entity 191. For example, if the junction table is organized in rows of trigger couplings, the system can delete the row of junction table for the deselected entity 191. The system can then update the dependency references 193 and invalidate the caches for deselected entity 195.

Figure 14:
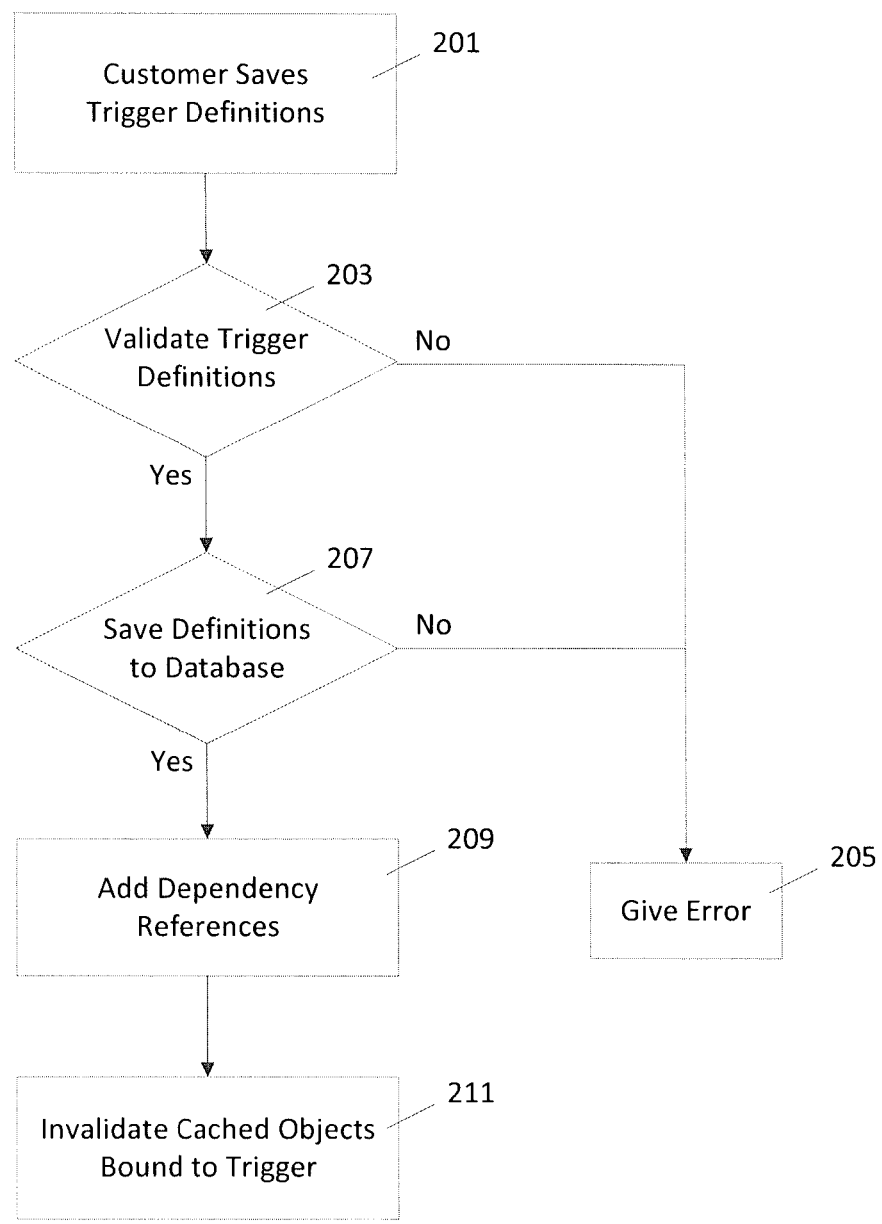
FIG. 14 illustrates a flow chart for saving trigger definitions.

Once the desired proper loose trigger entities have been selected, the system may validate the trigger and save the trigger definitions to a trigger metadata database which can be a "junction table." or any other similar database structure. If a loosely coupled trigger's procedural code is changed after initial save, the system may validate the trigger and save it to the trigger metadata database. With reference to FIG. 14, a system flowchart is illustrated showing the actions taken after the customer saves trigger definition 201. The system then determines if the trigger definition is valid 203. If the trigger definition is not valid, the system can give an error message 205 to the customer. If the trigger definition is valid, the system can then attempt to save the trigger definition to the database 207. If the definition cannot be saved, the system can give an error message 205 and if the definition is saved, the system can add dependency references 209 and then invalidate any previously cached entities bound to the trigger 211. There are various possible reasons why a trigger definition may not be saved. For example, if the trigger contains syntax or other coding errors, such as a static reference to a nonexistent entity, that prevents compilation, the system may prevent the trigger definition from being saved. In another examples, the trigger definition may not be saved because of limits imposed by the database provider, or limitations on changes that can be made to packaged triggers once users have installed them.

Figure 15:
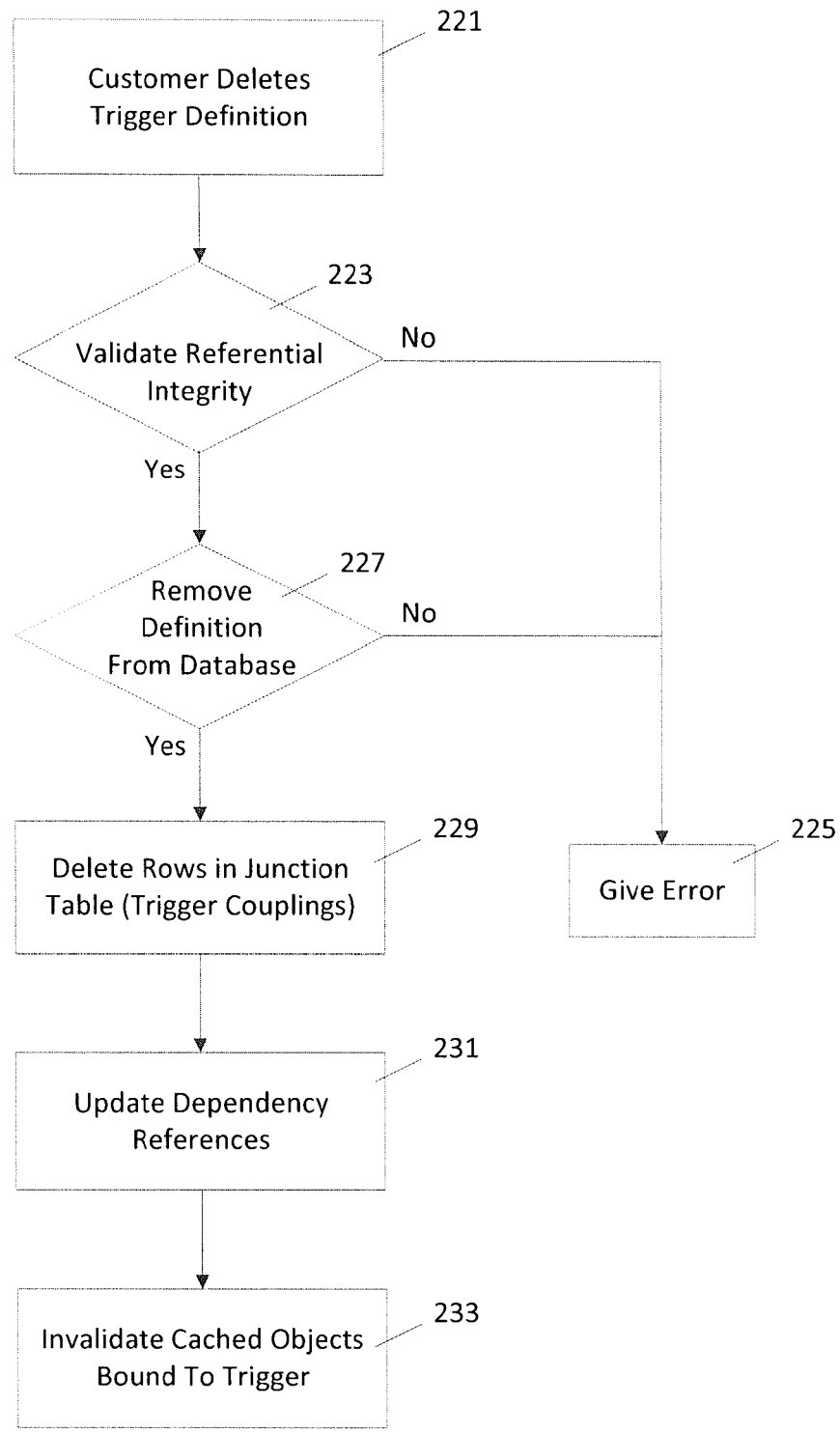
FIG. 15 illustrates a flow chart for deleting trigger definitions.

With reference to FIG. 15, a flow chart is illustrated showing the steps that the system may perform, if the user decides to delete a trigger definition 221. The system can validate that removing the trigger will not break referential integrity 223. If the trigger deletion cannot be validated, the system can give an error message 225. If the trigger deletion is validated, the system can attempt to remove the trigger definition from the database 227. The system can issue an error 225 if the definition cannot be removed from the database. If the trigger definition is removed from the database, the system may then delete the rows in the trigger metadata database or junction table which are the trigger couplings 229. The system can then update the dependency references 231 to account for the trigger removal and invalidate cached entities bound to the deleted trigger 233.

Figure 16:
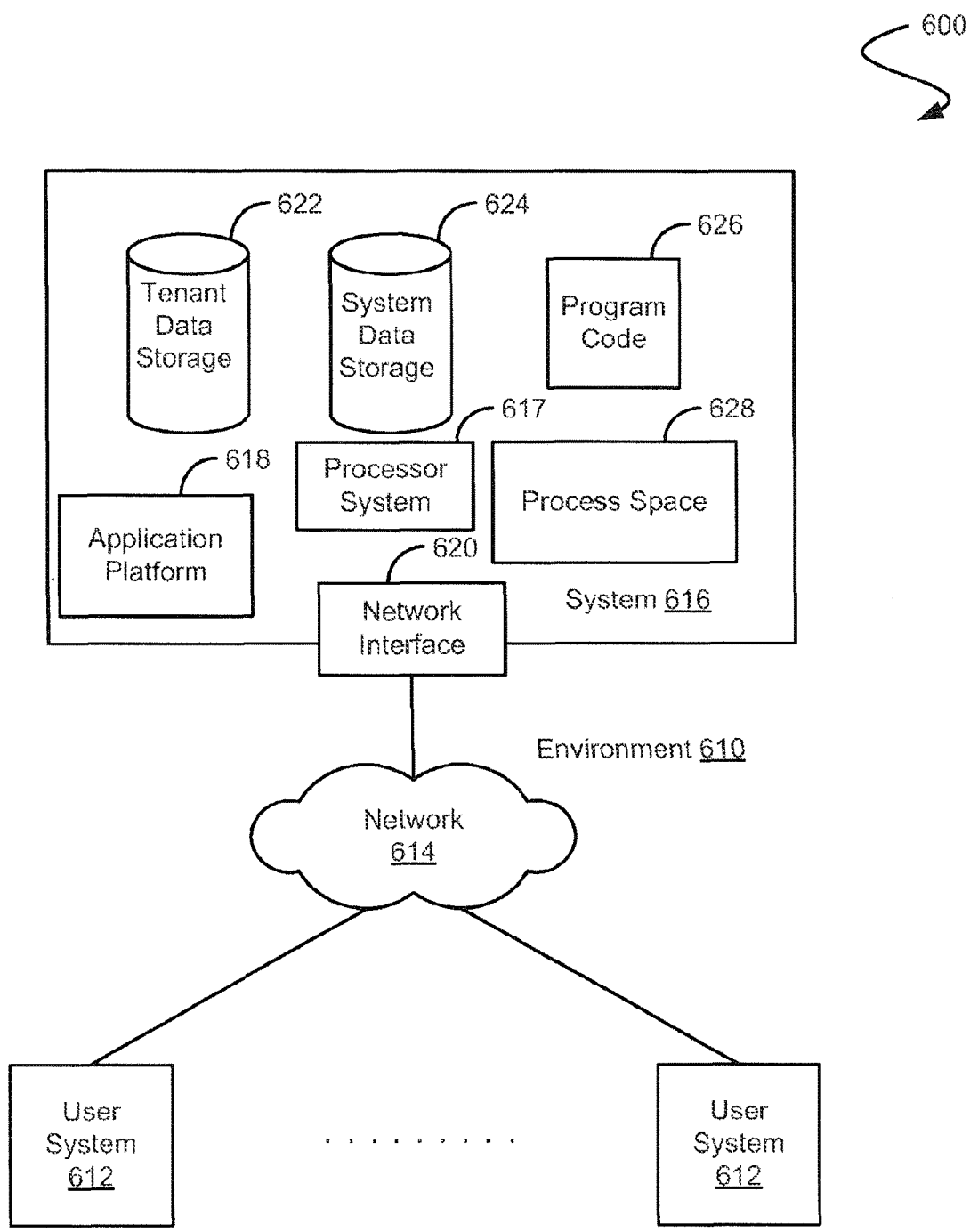
FIG. 16 illustrates a block diagram of an example of an environment wherein an on-demand database service might be used.

FIG. 16 illustrates a block diagram of an environment 610 wherein an on-demand database service might be used. Environment 610 may include user systems 612, network 614, system 616, processor system 617, application platform 18, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 16 (and in more detail in FIG. 17) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDBMS) or the equivalent may execute storage and retrieval of information against the database object(s). Application platform 618 may be a framework that allows the applications of system 616 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 16, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 16, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 16 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 17:
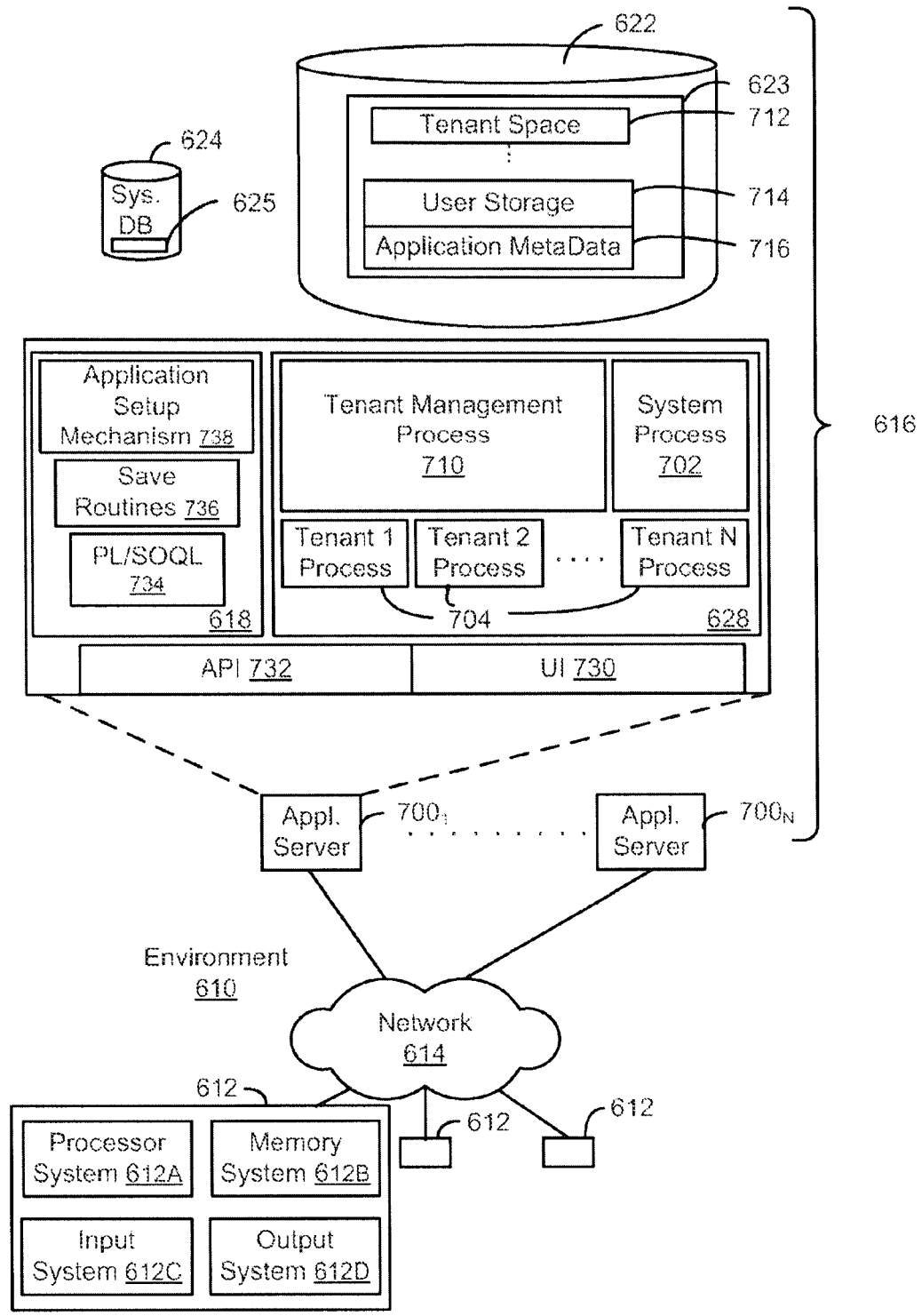
FIG. 17 illustrates a block diagram of an embodiment of elements of FIG. 16 and various possible interconnections between these elements.

FIG. 17 also illustrates environment 610. However, in FIG. 17 elements of system 616 and various interconnections in an embodiment are further illustrated. FIG. 16 shows that user system 612 may include processor system 612A, memory system 612B, input system 612C, and output system 612D. FIG. 17 shows network 614 and system 616. FIG. 17 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 16. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 17, system 616 may include a network interface 620 (of FIG. 16) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for using a database program with loose triggers, the method comprising:
    providing by the database program, a first loose trigger;
    receiving by the database program, a selection of a first entity from a plurality of entities associated with a plurality of organizations, each entity being a subdivision of an associated organization and being associated with a plurality of databases;
    storing by the database program, the selected first entity and the first loose trigger in a metadata database before code associated with the first loose trigger is compiled and the first loose trigger is coupled to one of the plurality of entities; and
    coupling the selected first entity with the first loose trigger after the code associated with the first loose trigger has been compiled such that at least the selected first entity of the plurality of entities is coupled to the first loose trigger after the first loose trigger has been compiled, the first loose trigger causing a change to one of the plurality of databases associated with the selected first entity in response to being triggered.

2. The method of claim 1 further comprising:
    detecting by the database program, the first entity interacting with a database; and
    actuating by the database program, the first loose trigger in response to the detecting the first entity.

3. The method of claim 2 further comprising:
    receiving by the database program, a second entity that is selected from the listing of entities, the second entity having a different associated organization than the first entity;
    storing by the database program, the second entity with the first loose trigger in the metadata database.

4. The method of claim 3 further comprising:
  detecting by the database program, the second entity interacting with the database; and
  actuating by the database program, the first loose trigger in response to the detecting of interaction of the second entity with the database.

5. The method of claim 1 further comprising:
  validating by the database program, the first entity before storing the first entity with the first loose trigger in the metadata database, the validating comprising determining if the storing violates a trigger rule that limits use of the first loose trigger and allowing the storing when the trigger rule is not violated by the storing.

6. The method of claim 1 further comprising:
  invalidating by the database program, the first entity, the invalidating comprising determining if the storing violates a trigger rule that limits use of the first loose trigger; and
  preventing by the database program, the storing of the first entity in the metadata database when the trigger rule is violated by the storing.

7. The method of claim 1 further comprising:
  displaying by the database program, the trigger program code in a portion of the user interface;
  wherein the trigger program code is editable.

8. A computer program product comprising computer-readable program code to be executed by one or more processors when retrieved from a non-transitory machine-readable medium, the program code including instructions to
  provide by the database program, a first loose trigger;
  receive by the database program, a selection of a first entity from a plurality of entities associated with a plurality of organizations, each entity being a subdivision of an associated organization and being associated with a plurality of databases;
  store by the database program, the selected first entity and the first loose trigger in a metadata database before code associated with the first loose trigger is compiled and the first loose trigger is coupled to one of the plurality of entities; and
  couple the selected first entity with the first loose trigger after the code associated with the first loose trigger has been compiled such that at least the selected first entity of the plurality of entities is coupled to the first loose trigger after the first loose trigger has been compiled, the first loose trigger causing a change to one of the plurality of databases associated with the selected first entity in response to being triggered.

9. The computer program product as recited in claim 8, the program code including instructions to:
  detect by the database program, the first entity interacting with a database; and
  actuate by the database program, the first loose trigger in response to the detecting of the first entity.

10. The computer program product as recited in claim 9, the program code including instructions to:
  receive by the database program, a second entity that is selected from the listing of entities, the second entity having a different associated organization than the first entity; and
  store by the database program, the second entity with the first loose trigger in the metadata database.

11. The computer program product as recited in claim 10, the program code including instructions to:
  detect by the database program, the second entity interacting with a database; and
  actuate by the database program, the first loose trigger in response to the detecting of interaction of the second entity with the database.

12. The computer program product as recited in claim 8, the program code including instructions to:
  validate by the database program, the first entity before storing the first entity as a first loose trigger definition in the metadata database, the program code to validate comprising program code to determine if the storing violates a trigger rule that limits use of the first loose trigger and program code to allow the storing when the trigger rule is not violated by the storing.

13. The computer program product as recited in claim 8, the program code including instructions to:
  invalidate by the database program, the first entity, the invalidating comprising determining if the storing violates a trigger rule that limits use of the first loose trigger; and
  prevent by the database program, the storing of the first entity with the first loose trigger in the metadata database when the trigger rule is violated by the storing.

14. The computer program product as recited in claim 8, the program code including instructions to:
  display by the database program, the trigger program code in a portion of the user interface;
  wherein the trigger program code is editable.

15. An apparatus for using a database program with loose triggers, the apparatus comprising:
  a processor; and
  one or more stored sequences of instructions which, when executed by the processor, cause the processor to:
  provide by the database program, a first loose trigger;
  receive by the database program, a selection of a first entity from a plurality of entities associated with a plurality of organizations, each entity being a subdivision of an associated organization and being associated with a plurality of databases;
  store by the database program, the selected first entity and the first loose trigger in a metadata database before code associated with the first loose trigger is compiled and the first loose trigger is coupled to one of the plurality of entities; and
  couple the selected first entity with the first loose trigger after the code associated with the first loose trigger has been compiled such that at least the selected first entity of the plurality of entities is coupled to the first loose trigger after the first loose trigger has been compiled, the first loose trigger causing a change to one of the plurality of databases associated with the selected first entity in response to being triggered.

16. The apparatus as recited in claim 15, the one or more stored sequences of instructions, when executed, will cause the one or more processors to:
  detect by the database program, the first entity interacting with a database; and
  actuate by the database program, the first loose trigger in response to the detecting of the first entity.

17. The apparatus as recited in claim 16, the one or more stored sequences of instructions, when executed, will cause the one or more processors to:
  receive by the database program, a second entity that is selected from the listing of entities, the second entity having a different associated organization than the first entity; and
  store by the database program, the second entity with the first loose trigger in the metadata database.

18. The apparatus as recited in claim 17, the one or more stored sequences of instructions, when executed, will cause the one or more processors to:
  detect by the database program, the second entity interacting with a database; and
  actuate by the database program, the first loose trigger in response to the detecting of the second entity.

19. The apparatus as recited in claim 17, the one or more stored sequences of instructions, when executed, will cause the one or more processors to:
  invalidate by the database program, the first entity, the invalidating comprising determining if the storing violates a trigger rule that limits use of the first loose trigger; and
  prevent by the database program, the storing of the first entity as the trigger definition in the metadata database when the trigger rule is violated by the storing.

20. The apparatus as recited in claim 15, the one or more stored sequences of instructions, when executed, will cause the one or more processors to:
  validate by the database program, the first entity before storing the first entity as a trigger definition in the metadata database, the program code to validate comprising program code to determine if the storing violates a trigger rule that limits use of the first loose trigger and program code to allow the storing when the trigger rule is not violated by the storing.

21. The apparatus as recited in claim 15, the processor further carrying out the steps of:
  display by the database program, the trigger program code in a portion of the user interface;
  wherein the trigger program code is editable.

\* \* \* \* \*